United States Patent [19]

Zilberman

[11] Patent Number: 5,000,722
[45] Date of Patent: Mar. 19, 1991

[54] COUPLING MEMBER FOR ROTATABLE SHAFTS

[75] Inventor: Jossef Zilberman, Randallstown, Md.

[73] Assignee: Kop-Flex, Inc., Baltimore, Md.

[21] Appl. No.: 499,591

[22] Filed: Mar. 26, 1990

[51] Int. Cl.[5] .............................................. F16D 3/78
[52] U.S. Cl. ....................................... 464/79; 464/80
[58] Field of Search .............................. 464/79, 80, 99

[56] References Cited

U.S. PATENT DOCUMENTS

| | | | |
|---|---|---|---|
| 1,414,411 | 5/1922 | Herreshoff et al. | 464/80 |
| 1,605,356 | 11/1926 | Leipert | 464/80 X |
| 1,606,514 | 11/1926 | Crist | 464/80 |
| 1,639,644 | 8/1927 | Baumann | 464/79 |
| 2,647,380 | 8/1953 | Troeger et al. | 464/99 |
| 4,265,099 | 5/1981 | Johnson et al. | 464/79 X |

FOREIGN PATENT DOCUMENTS

| | | | |
|---|---|---|---|
| 454924 | 3/1949 | Canada | 464/80 |
| 888339 | 8/1953 | Fed. Rep. of Germany | 464/80 |

Primary Examiner—Thomas R. Hannon
Attorney, Agent, or Firm—Cushman, Darby & Cushman

[57] ABSTRACT

A coupling member comprises peripheral flanges and a body, with the peripheral flanges having the same axis of rotation. The body of the coupling member has a smoothly curving hub portion extending to two axially separated disk portions and is defined by three relationships. A thickness relationship describes the thickness of the body throughout the hub and disk portions. A spacing relationship describes how much of the body is to be occupied by the hub portion. A continuity relationship describes the thickness of the body within the hub portion.

15 Claims, 2 Drawing Sheets

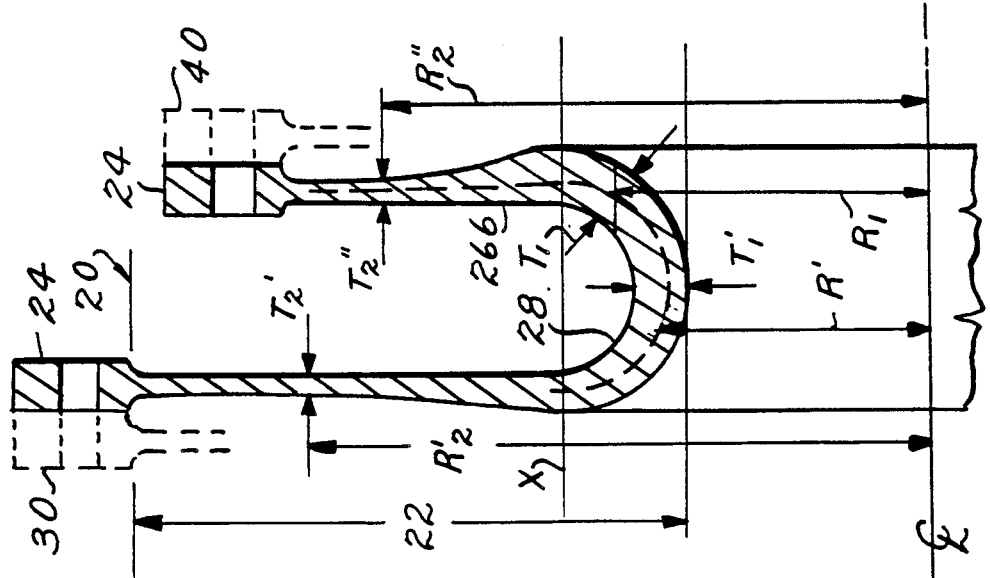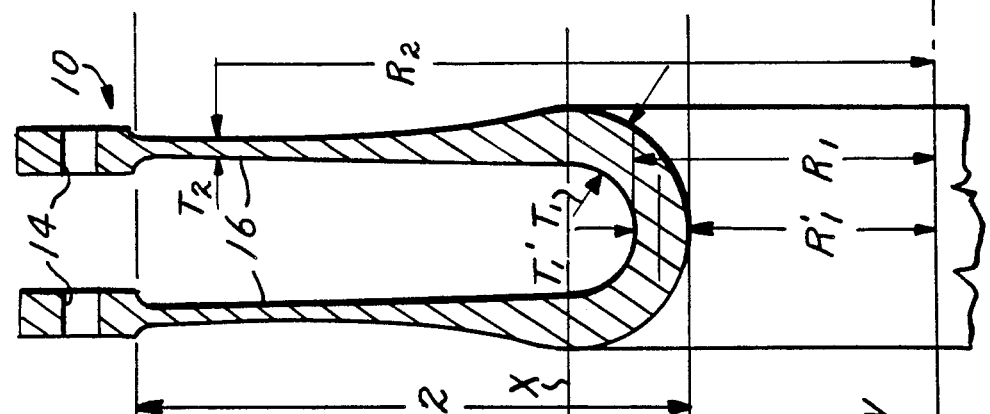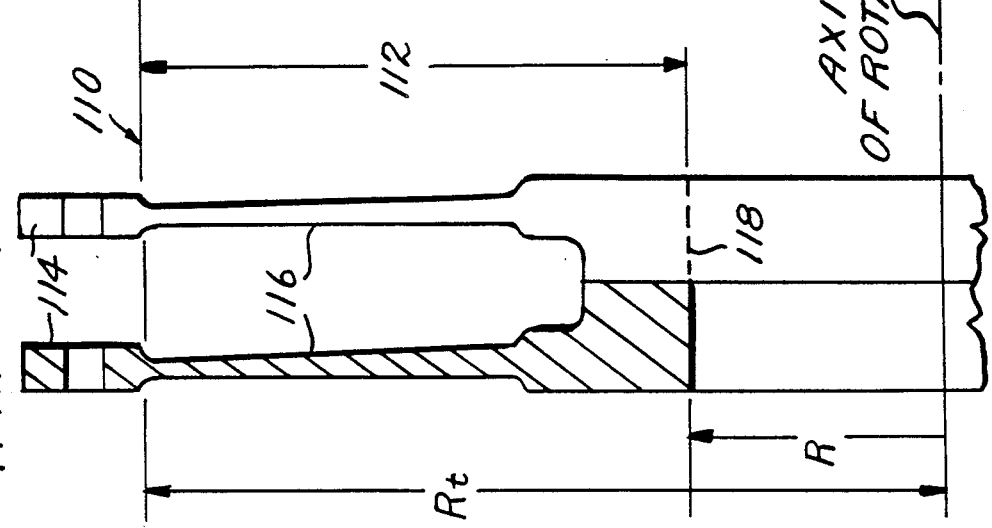

COUPLING MEMBER FOR ROTATABLE SHAFTS

BACKGROUND OF THE INVENTION

1. Field of the Invention

The present invention relates to flexible couplings for rotatable shafts, and more particularly, to couplings permitting both angular and axial misalignment between coupled shafts.

2. Description of Prior Art

In order to accommodate misalignment and torque, flexible couplings have been employed between rotatable shafts having fixed or variable misalignment. Such couplings are connected typically about peripheral flanges so as to transmit torque from one shaft to the other shaft while absorbing and sometimes dissipating the effects of misalignment. An example of one type of such flexible couplings is described in U.S. Pat. No. 2,647,380.

The practical coupling construction of the prior art is shown in FIG. 5 where coupling member 110 comprises body 112 and two peripheral flanges 114. Body 112 has two axially separated disk portions 116, which extend radially outward from the axis of rotation, and annular hub portion 118. The massive hub portion 118 is rigid and heavy, accounting for a large percentage of the weight of the entire coupling member 110. Peripheral flanges 114 are formed at the outer ends of disk portions 116 of body 112 such that both peripheral flanges 114 rotate about the axis of rotation.

Such conventional couplings have a major disadvantage: limited degree of flexibility. For a given misalignment, the coupling member is subjected to high stresses. The coupling member responds with high reaction forces transmitted to the connected equipment. If during operation the misalignment changes due to unforeseen circumstances, the flexible element may fail due to fatigue fractures. In addition, if the connected machines are modified to result in an increase in misalignment compared to the original set-up, the coupling member must be redesigned or configured to avoid costly failures. One common way of increasing misalignment tolerance is to incorporate additional flexible elements 110, thereby resulting in a heavier and more expensive construction.

Limited flexibility results primarily from the massive hub portion 118. As shown in FIG. 5, hub portion 118 occupies approximately 15% to 30% of the available Rt-Ri envelope (i.e., the space wherein body 112 is located). Since hub portion 118 is rigid, flexibility is limited to the disk portions 116 in the remaining 70% to 85% of the Rt-Ri envelope.

Fatigue fractures primarily result from structural designs that are too rigid to tolerate either steady or transient deformations of the coupling in use. For example, the structural design shown in FIG. 5 generally experiences fatigue fractures in the thin disk portion 116.

Accordingly, a structural design is desired which significantly reduces fatigue and stress fractures from increased misalignment, and which is more flexible and lighter without adding to the fabrication cost.

SUMMARY OF THE INVENTION

An object of the present invention is to provide a coupling member which transmits torque between shafts having fixed or variable misalignment.

It is a further object to provide a coupling member with a unique structural configuration which greatly increases flexibility and reduces fatigue and stress fractures in operation.

It is still another object to provide a coupling member which accommodates more misalignment and is lighter than the prior art construction, while occupying the same dimensional envelope.

To achieve these objects, a coupling member according to the present invention comprises two outer, spaced peripheral flanges and a connecting body. The body has a smoothly curving hub portion extending to two axially spaced disk portions. The profile of the coupling member is contoured such that its thickness varies with the radius from the axis of rotation. This variation is established according to the misalignment and torque of the specific application.

The coupling member according to the present invention is defined by three relationships. First, the thickness of the body is defined by the following relation:

$$\left(\frac{R_2}{R_1}\right)^n < T < \left(\frac{R_2}{R_1}\right)^N,$$

where $T = T/T_2$ and $T_2$ is the thickness of the hub portion at any radius $R_1$ from the axis of rotation, and $T_2$ is the minimum thickness of the disk portion at a radius $R_2$ from the axis of rotation. According to this invention, exponent n is 1.25 and exponent N is 2.5.

The second relationship defines the curving hub portion to occupy between 5% and 40% of the coupling member envelope.

The third relationship defines the continuity of the thickness of the curving hub portion 18 as:

$$\left(\frac{R_1}{R_1'}\right)^{1.25} < \frac{T_1'}{T_1} < \left(\frac{R_1}{R_1'}\right)^{2.5},$$

where $R_1$, $T_1$ and $R_1'$ and $T_1'$ are any arbitrarily selected pairs of radii and respective thicknesses with $R_1$ being equal to or larger than $R_1'$.

The coupling member may have a symmetric "U" shape, or a non-symmetric "J" shape where the disk portions have different radial dimensions.

BRIEF DESCRIPTION OF THE DRAWING

These and other advantages will become more apparent from the detailed description of the preferred embodiment along with the following drawings wherein like reference numerals indicate like parts:

FIG. 2 is a sectional view of a "U" shaped coupling member according to the present invention on one side of the axis of rotation;

FIG. 4 is a sectional view of a "J" shaped coupling member according to the present invention on one side of the axis of rotation; and FIG. 5 is a sectional view of a PRIOR ART coupling member again on one side of the axis of rotation.

DESCRIPTION OF THE PREFERRED EMBODIMENT

Figure 1:
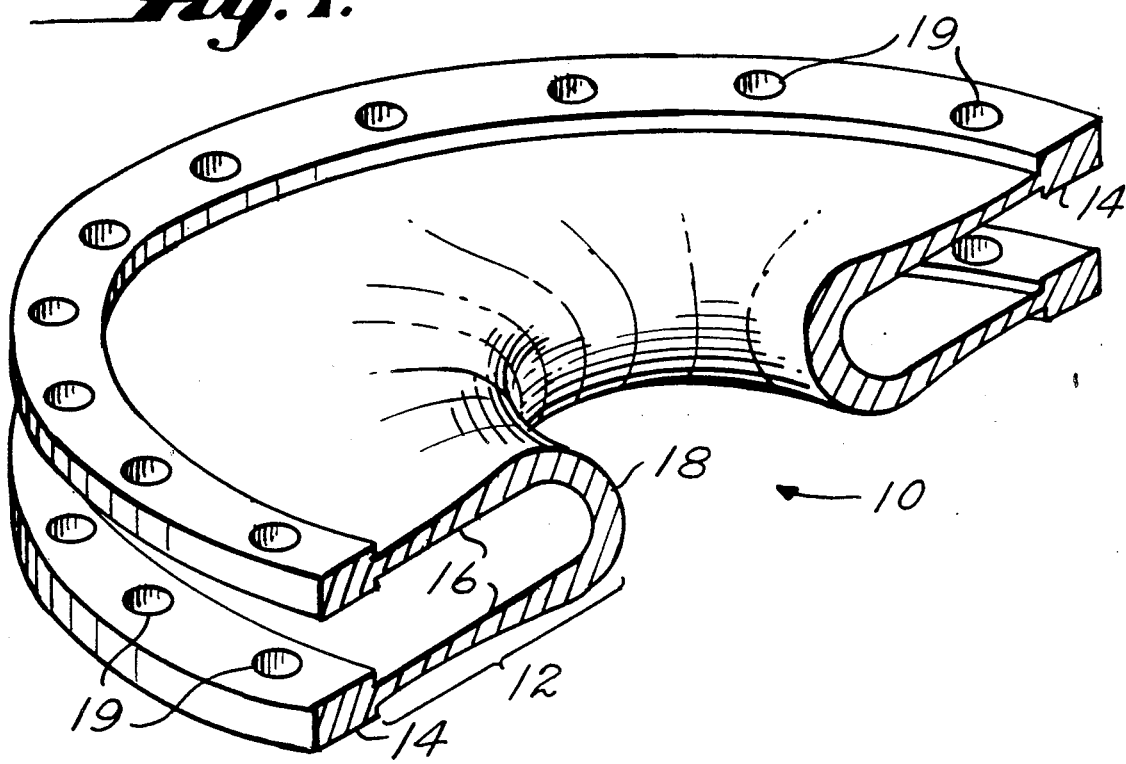
FIG. 1 is a perspective view, partly in section, of a "U" shaped coupling member.

FIGS. 1-4 show two embodiments of coupling member 10, 20 according to the present invention. Coupling member 10, 20 comprises body 12, 22 and two peripheral flanges 14, 24. Body 12, 22 has two axially separated disk portions 16, 26 which extend radially outwardly relative to the rotational axis and hub portion 18, 28 which forms the common hub of the disk portions 16, 26. As illustrated by broken line X in FIGS. 2 and 4, hub portion 18, 28 is formed with a smooth, semi-toroidal shape below line X and disk portions 16, 26 extend smoothly, that is, without any abrupt transitions, radially from hub portion 18, 28 above line X. Body 12, 22 extends continuously from the disk portion 16, 26 radially inward toward the axis of rotation, through smoothly curving hub portion 18, 28, and then radially outward from the axis of rotation to the other disk portion 16, 26.

Disk portions 16, 26 each terminate with peripheral flanges 14, 24 which are integrally formed at the ends of disk portions 16, 26 and are provided with spaced apertures 19, 29 to enable mounting with bolts to shaft flanges or adjacent coupling members. For example, as illustrated in FIG. 4, both peripheral flanges 24 are adapted to couple to adjacent coupling members 30 and 40.

Figure 3:
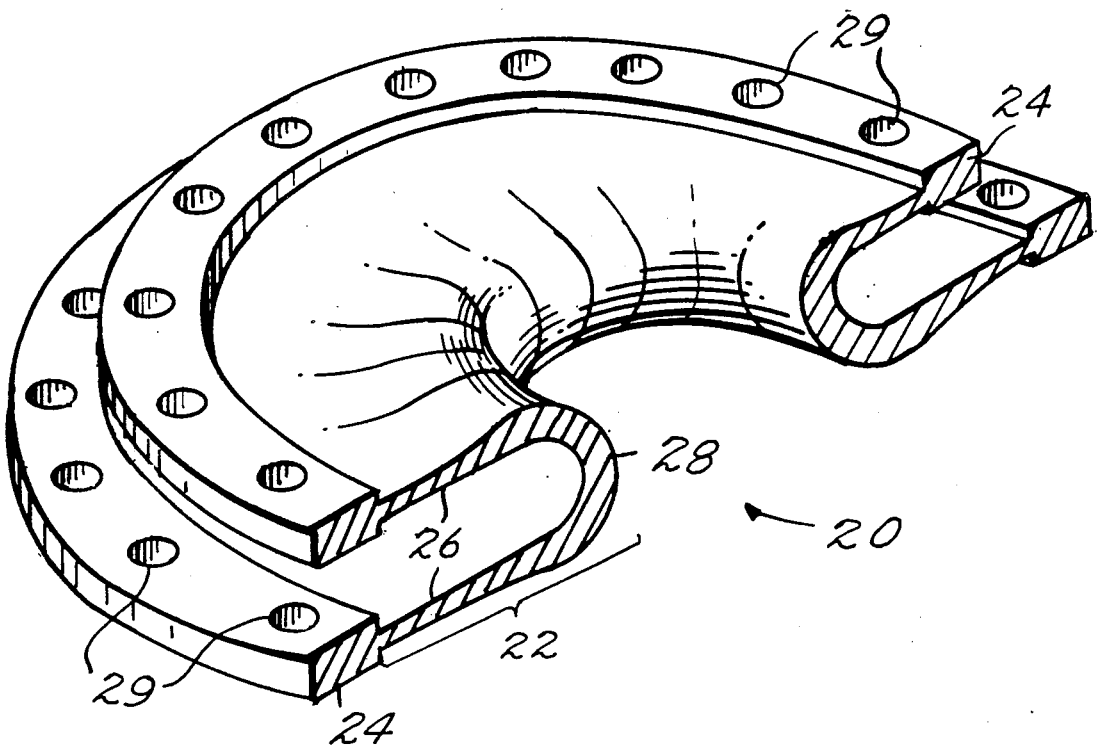
FIG. 3 is a perspective view, partly in section, of a "J" shaped coupling member.

In a first embodiment of the present invention, peripheral flanges 14 may have the same radius from the axis of rotation, and hence are symmetric and in section as shown in FIGS. 1 and 2 appear "U" shaped. In a second embodiment, peripheral flanges 24 are of different radii from the axis of rotation, and hence may be described as "J" shaped in sectional view (FIGS. 3 and 4).

Flexibility of coupling member 10, 20 is primarily attributable to the smooth contour transition from disk portion 16, 26 to hub portion 18, 28, and the smooth, semi-toroidal shape of hub portion 18, 28 below line X. This smooth, curving shape of coupling member 10, 20 is defined by three relationships: a thickness relationship, a spacing relationship, and a continuity relationship.

1. Thickness Relationship

In the embodiment shown in FIG. 2, body 12 has a thickness varying from a thickness T, in disk portions 16 at a radius $R_2$ from the axis of rotation, to thickness $T_1$ in hub portion 18 at a radius $R_1$ from the axis of rotation. The thickness of body 12 between thickness $T_1$ and thickness $T_2$ changes according to the following relation:

$$\left(\frac{R_2}{R_1}\right)^n < T < \left(\frac{R_2}{R_1}\right)^N, \quad (1)$$

where $T = T_1/T_2$. Exponent n is preferably 1.25 and exponent N is preferably 2.5.

In the second embodiment shown in FIG. 4, body 22 has a thickness varying along disk portion 26a from a thickness $T_2'$ at a radius $R_2'$ from the rotational axis to a larger thickness $T_1$ at hub portion 28. Along disk portion 26b, body 22 has a thickness varying from a thickness $T_2''$ is at a radius $R_2''$ from the rotational axis to thickness $T_1$.

In accordance with the equation (1), the thickness of body 22 for the "J" shaped embodiment along disk portion 26a changes as follows:

$$\left(\frac{R_2'}{R_1}\right)^n < T < \left(\frac{R_2'}{R_1}\right)^N, \quad (2)$$

where, $T = T_1/T_2'$ and $R_1$, $R_2$, n and N are defined as in the previous embodiment. Similarly, per equation (1), the thickness of body 22 along disk portion 26b changes:

$$\left(\frac{R_2''}{R_1}\right)^n < T < \left(\frac{R_2''}{R_1}\right)^N, \quad (3)$$

where $T = T_1/T_2''$.

2. Spacing Relationship

The second relationship is concerned with the percentage of the Rt-Ri envelope occupied by hub portion 18, 28. According to the present invention, curving hub portion 18, 28 may occupy 5% to 40% of the Rt-Ri envelope. This relationship is defined as:

$$0.05(Rt - Ri) < D < 0.40(Rt - Ri), \quad (4)$$

where D is the distance between line X and radius Ri.

3. Continuity Relationship

The continuity of the thickness of the curving hub portion 18, 28 between radius Ri and line X is defined as follows:

$$\left(\frac{R_1}{R_1'}\right)^{1.25} < \frac{T_1'}{T_1} < \left(\frac{R_1}{R_1'}\right)^{2.5}, \quad (5)$$

where $R_1$, $T_1$ and $R_1'$ and $T_1'$ are any arbitrarily selected pairs of radii and respective thicknesses with $R_1$ being equal to or larger than $R_1'$.

The resultant thin, smooth, curving contour of coupling member 10, 20, which satisfies the three relationships of the present invention, is significantly more flexible than the prior art coupling members. Further, the smoothly curving hub portion 18, 28 is substantially lighter than a coupling member having the rigid, massive hub portion 118 (FIG. 5) of the prior art.

Due to the specific relations described above and the resultant unique structural dimensions, the present invention provides an effective coupling between two drive shafts having fixed or variable misalignment and substantially reduces fatigue and stress fractures in operation. For many applications, the coupling may be constructed of metal such as steel and may be constructed from two symmetrical portions which are assembled by welding. It will be understood that other applications will permit the use of polymeric plastics such as polyethylene or composite materials such as fiberglass which may be resin coated.

It is to be understood that the invention is not limited to the disclosed embodiment, but is intended to cover various modifications and equivalent arrangements included within the spirit and scope of the appended claims.

What is claimed is:

1. A coupling member for a pair of rotatable shafts comprising first and second annular portions each having means for connection to one of the shafts so that said member will transmit rotary motion of one shaft to the other shaft, a body connecting said first and second annular portions so that said annular portions have a substantially common axis of rotation, said body having a pair of outer peripheral portions each respectively joined to a said respective annular portion, said body extending continuously from one of said outer peripheral portions radially inwardly toward said common axis to define a smoothly curving inner portion and from said inner portion to said other outer peripheral portion, the thickness of said body being defined by the following relation:

$$\left(\frac{R_2}{R_1}\right)^n < T < \left(\frac{R_2}{R_1}\right)^N$$

where $T=T_1/T_2$ and $T_1$ is any thickness in the inner portion; $T_2$ is the minimum thickness in the region between the outer peripheral portions and said inner portion; $R_1$ is the radial position from said common axis at which the thickness is measured for the inner portion; $R_2$ is the radial position from said common axis of the minimum thickness in said region; and n is 1.25 and N is 2.5.

2. The invention as claimed in claim 1 wherein said body and said annular portions are integrally formed.

3. The invention as claimed in claim 1 wherein one of said annular portions lies at a lesser radial distance from said common axis than the other said annular portion.

4. The invention as claimed in claim 1 wherein said annular portions lie at the same radial distance from said common axis.

5. The invention as claimed in claim 1 wherein said inner portion of said body is partially toroidally shaped.

6. The invention as claimed in claim 1 wherein said coupling member is made from a metal.

7. The invention as claimed in claim 6 wherein said metal is steel.

8. The invention as claimed in claim 1 wherein said coupling member is made from a composite, non-metallic material.

9. The invention as claimed in claim 1 wherein said coupling member is made from a polymeric plastic.

10. A coupling system comprising a plurality of coupling members as defined in claim 1 wherein said first annular portion of a said coupling member is joined to the said second coupling member of an adjacent coupling member so that an axially extending coupling system is provided and having a pair of axially outermost coupling members.

11. The invention as claimed in claim 10 wherein one of said pair of outermost coupling members is connected to a drive shaft.

12. The invention as claimed in claim 11 wherein the other of said pair of outermost coupling members is connected to a driven shaft.

13. The invention as claimed in claim 1, wherein said smoothly curving inner portion occupies between 5% to 40% of the length of said body.

14. The invention as claimed in claim 1, wherein said smoothly curving inner portion is further defined by the following relation:

$$\left(\frac{R_1}{R_1'}\right)^{1.25} < \frac{T_1'}{T_1} < \left(\frac{R_1}{R_1'}\right)^{2.5},$$

where $R_1$, $T_1$ and $R_1'$ and $T_1'$ are any arbitrarily selected pairs of radii and respective thicknesses with $R_1$ being equal to or larger than $R_1'$.

15. The invention as claimed in claim 1 wherein said body of said coupling is formed by joining two of said annular portions by welding.

* * * * *